(12) United States Patent
McNelley et al.

(10) Patent No.: US 8,947,500 B1
(45) Date of Patent: Feb. 3, 2015

(54) TELEPRESENCE CAMERA SYSTEM

(75) Inventors: Steve H. McNelley, San Juan Capistrano, CA (US); Jeffrey S. Machtig, Lake Forrest, CA (US)

(73) Assignee: Videotronic Systems, San Juan Capistrano, CA (US)

( * ) Notice: Subject to any disclaimer, the term of this patent is extended or adjusted under 35 U.S.C. 154(b) by 0 days.

(21) Appl. No.: 13/292,012

(22) Filed: Nov. 8, 2011

Related U.S. Application Data

(62) Division of application No. 11/378,784, filed on Mar. 18, 2006, now Pat. No. 8,072,481.

(51) Int. Cl.
*H04N 7/15* (2006.01)

(52) U.S. Cl.
USPC ..................... 348/14.16; 348/14.08

(58) Field of Classification Search
USPC .......... 348/14.08, 14.09, 14.01, 14.03, 14.07, 348/14.11, 14.14, 14.16; 108/50.02
See application file for complete search history.

(56) References Cited

U.S. PATENT DOCUMENTS

| | | | |
|---|---|---|---|
| 5,479,203 A * | 12/1995 | Kawai et al. | 348/14.1 |
| 5,778,082 A * | 7/1998 | Chu et al. | 381/92 |
| 5,959,667 A * | 9/1999 | Maeng | 348/211.99 |
| 2002/0044201 A1 * | 4/2002 | Alexander et al. | 348/14.08 |
| 2003/0184645 A1 * | 10/2003 | Biegelsen et al. | 348/14.1 |
| 2004/0233273 A1 * | 11/2004 | Ferren et al. | 348/14.08 |
| 2007/0070177 A1 * | 3/2007 | Christensen | 348/14.01 |

* cited by examiner

*Primary Examiner* — Stella Woo
(74) *Attorney, Agent, or Firm* — Stefan J. Kirchanski; Venable LLP

(57) ABSTRACT

A telepresence communication system for group meeting rooms and personal home and office systems provides improved human factor experience through substantially life size images with eye level camera placement. The system provides switched presence interfaces so that conferees can select when to transmit their images during a conference and optionally provides individual microphones for each of conferee. Switched presence between presets of conferees are viewed on multipoint windows overlaying life-size images upon eye contact camera regions and eliminate seeing camera image movement during pan, tilt and zoom operations. An ambient light rejecting filter system enables an eye level camera to be hidden behind a projection screen and provides bright, high contrast images under normal meeting room and office environments. A telepresence organizational enablement system brings all the features of a corporate office complex and its social and organizational benefits, into a virtual community eliminating the need to centralize employees.

7 Claims, 5 Drawing Sheets

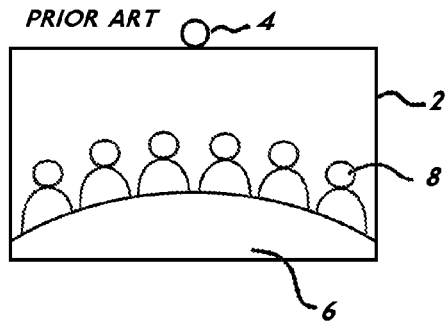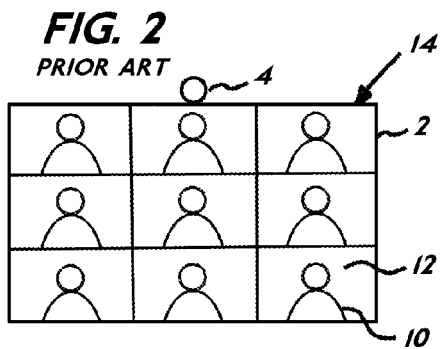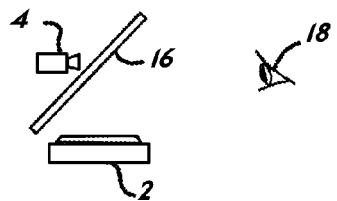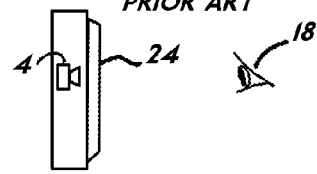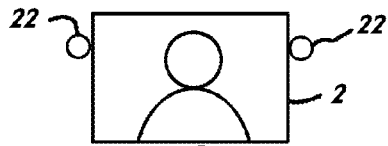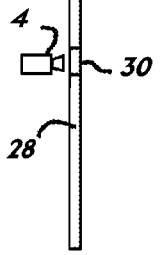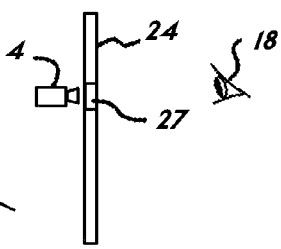

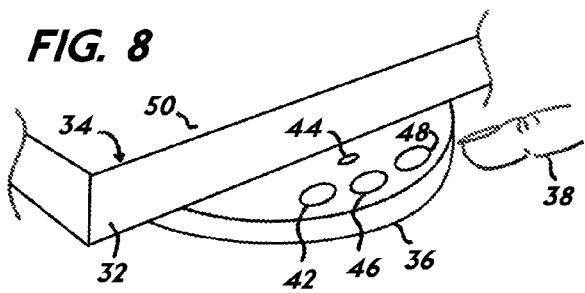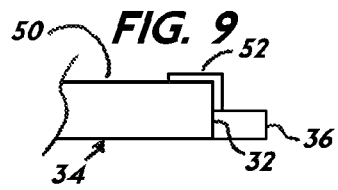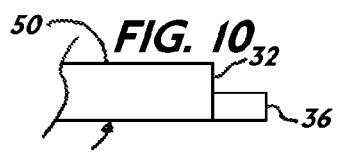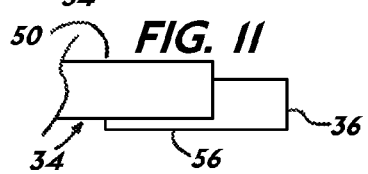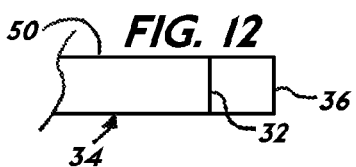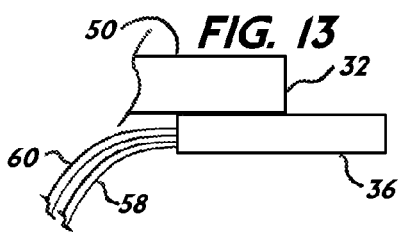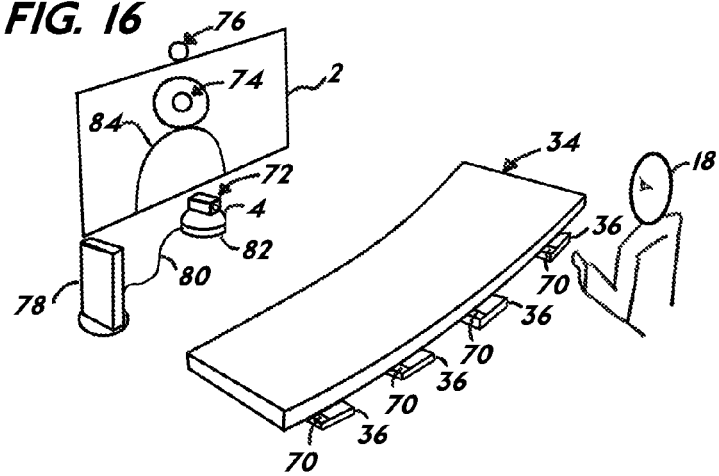

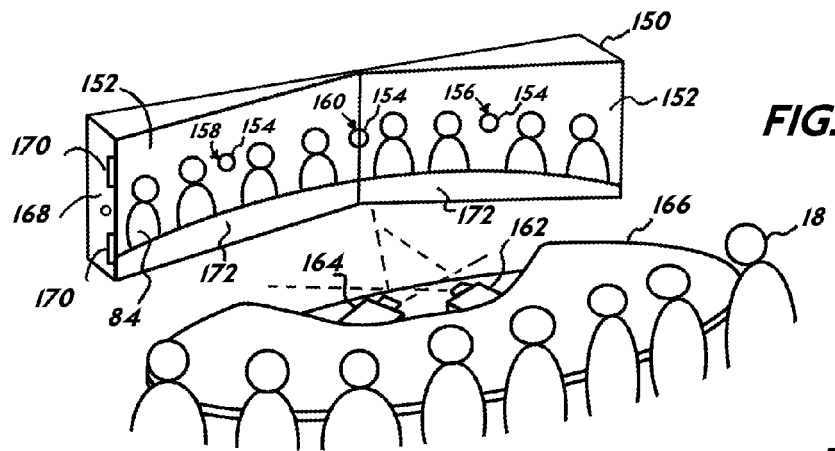
FIG. 25
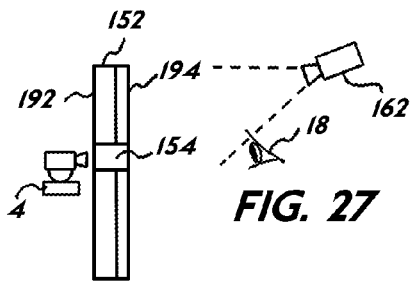
FIG. 27
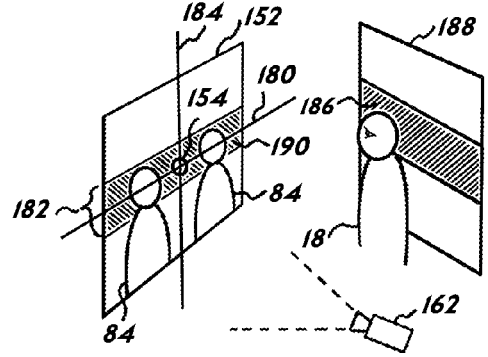
FIG. 26
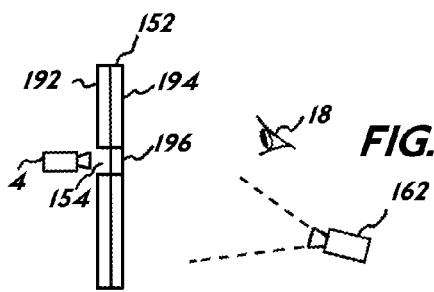
FIG. 28
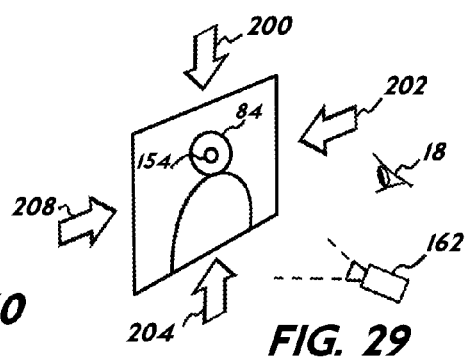
FIG. 30
FIG. 29

TELEPRESENCE CAMERA SYSTEM

CROSS-REFERENCE TO PRIOR APPLICATIONS

The present application is a divisional application of and claims priority from U.S. application Ser. No. 11/378,784, filed on Mar. 18, 2006, all of which is incorporated herein by reference.

U.S. GOVERNMENT SUPPORT

NA

BACKGROUND OF THE INVENTION

1. Area of the Art

The present invention concerns the area of telepresence communication terminals and systems so that people can see and hear one another from a distance in a realistic manner and, also, structure their organization around such communication.

2. Description of the Related Art

Videoconferencing has suffered from many problems that have affected its quality of performance and speed of adoption among consumers. Videoconferencing has suffered from costs of connection using ISDN to the complications of traversing firewalls for IP conferencing. Also, image quality is usually far less than common broadcast TV. Lastly, the human factors of videoconferencing have been a severe detriment to the quality of the communication experience. From the common web camera on top of the computer monitor to the codec appliance on top of a roll-about cart in a meeting room, most videoconferencing systems ignore fundamental aspects of human communication. With these systems, people appear to be looking away and not eye-to-eye and images of the conferees are often very small. As a result, videoconferencing is a poor communication medium, because it is recreating a false reality for the conferees where non-verbal cues are confused due to incorrect eye gaze and the conferees being awkwardly small.

Prior art FIG. 1 illustrates an image display 2 displaying a group of distant conferees 8 seated at a distant conference table 6. The group of distant conferees 8 if seen on a 50 inch plasma screen would appear about 85% smaller then life-size. Likewise, a common multipoint window array 14 (FIG. 2) shows the unnatural appearance of a stacked conferee 10 in a small stacked window 12. Again, if a 50" plasma panel were used the many stacked conferees 10 would appear about 85% smaller then life. Such small images of people, detracts from being able to see non-verbal body language which is the whole point of videoconferencing.

Large screen videoconferencing systems and multiple displays side-by-side have been utilized to create many life-size videoconferencing participants. These systems, though, often suffer from extreme bulk due to the depth of rear projection housings or poor image quality associated with front projection in meeting room lit environments. Multiple side-by-side displays are expensive solutions and require multiple codecs to operate. Also, eye contact suffers in these systems since the cameras are mounted at the boundaries of the large images.

In FIGS. 1 and 2, the camera 4 is seen on top of the display 2 which creates the awkward appearance of a bird's eye view down upon the group of distant conferees 8 and the stacked conferees 10. While the conferees look into their display to make eye contact they fail to look into the camera up above and hence the conferees appear to one another in their display to be looking down. Alternatively, if the camera 4 was mounted below the display the conferees would appear to be looking up. Still further, if the camera 4 was mounted to the side of the display 2 they would appear to be looking to the side. Eye contact is the chief of non-verbal cues and displaying an image of a person looking away when they intend to make eye contact is very distracting to quality communication. Essentially, traditional videoconferencing systems create a false non-verbal cue of seemingly looking away.

Several technologies have proposed a solution for resolving the eye contact problem. Optical light division using a beamsplitter 16 is seen in prior art FIG. 3. The beamsplitter 16 reflects the image display 2 so that a local conferee 18 views the reflection on the beamsplitter 16. The camera 4 is mounted behind the beamsplitter 16 and is aimed through the beamsplitter 16 capturing an image of the local conferee 18. An alternative use of the beamsplitter 16 reflects the local conferee 18 and that reflection is captured by the camera 4 (not shown). The local conferee 18 views the display 2 through the beamsplitter 16. Prior art FIG. 5 illustrates aiming the camera 4 through a transparent imaging device such as a liquid crystal display 24. The art has yet to present a method to aim the camera 4 through this type of prior art system without image quality reduction of the camera 4 and the LCD 24. Other eye contact technologies include image manipulating eye contact as is taught in U.S. Pat. No. 5,438,357. Image synthesis systems combining images from a left side camera 22 and a right side camera 23 (more cameras can be used) of the local conferee 18 has also been proposed as seen in prior art FIG. 5. These systems are expensive and complicated and provide inferior image results. Still further, the camera 4 has been mounted behind a common rear projection screen 24 as seen in prior art FIG. 6. These rear projection systems are extremely bulky and take up a large portion of valuable room space. Also, the camera 4 blocks a portion of the projected light from a projector 26 causing a shadow on the screen (not seen). Other rear projection eye contact technologies have also been proposed. An alternating liquid crystal screen that is diffused in one state and semitransparent in another state is synchronized with the camera 4 and the projector 26 to enable eye contact. This system, as well, suffers from image quality issues.

A common front projection screen 28 (prior art FIG. 7) has an open hole 30 in which the camera 4 captures an image of the local conferee 18 through. Front projection suffers from poor image quality in brightly lit meeting room environments where both brightness and contrast are reduced. Common front projection screens include simple white, grey, beaded, and reflective type surfaces. These common projection screens require the room light to be dimmed to a point where the projected images can be clearly seen and the images have high contrast (black levels). Unfortunately, the room lights must be dimmed so much that a meeting room environment becomes nonfunctional for common meeting tasks due to lack of ambient light. Also, the dark room does not permit effective image capturing of the conferees in the room for transmitting to the distant site. As a result, large screen videoconferencing rooms have relied on rear projection screens, because of its ability to maintain acceptable levels of brightness and contrast.

The prior art teaches in U.S. Pat. No. 6,554,433 placing a camera behind one of two screens at a workstation. The two screens are adjacent to one another at 90 degrees and thereby opposing one another. The viewer sits at an extreme oblique angle to both screens when viewing them. Since the screens are intended to be viewed from an oblique angle, the patent teaches the use of beveled lenses on the screens to improve the screen viewing from such extreme angles. The "introduction of bevels into the projection surface reduces the ambient light level of the opposing projection screen as the reflected light from projection screens . . . are reflected away from the opposing projection screen." As taught, the bevels do not reject ambient light from the room, but reduce the ambient light produced by the projection screens and thereby affecting the viewing of the opposing screen. The bevels, chiefly, are intended to enable the viewing of the image from a very sharp oblique angle and still have a uniform image. The prior art system suffers from the same issues as common front projection where contrast and brightness are substantially reduced by ambient room light. The prior art does not teach the use of ambient light rejecting filters that reject ambient room light from above, below, to the left and to the right of the projection screen and shooting a camera through a hole in such filters.

With all the hope and promise of videoconferencing over the past 25 years, videoconferencing has had surprisingly little impact on the way people form business organizations. Predominantly corporate videoconferencing is used to link one corporate meeting room with another. In essence, they extend the corporate campus out to other corporate campuses. The mantra "it is cheaper then flying" sums up the reason why businesses elect to invest in videoconferencing systems. But, the usual complaint, as described above (i.e., it just does not feel like you're there) prevails. Web cameras have also not been used as serious business communication tool because of the poor image and human factor issues. It is very apparent that videoconferencing has not delivered on its hope and promise as evident by the growth in the automobile and airline industries. So humans continue to consume natural resources and consume their time traveling to and from work. On an organizational level and, thereby, a societal level, videoconferencing has made little impact.

What is needed is a true telepresence experience that brings individuals from corporate meeting rooms to other meeting rooms and, also, to homes to have a real impact. The experience needs to be substantially different than common videoconferencing. True telepresence combines substantially life-size images, eye contact, high quality audio and video in an experience as if the imaged conferee is sitting on the other side of the desk or table. What is needed is a total system that is designed for organizational enablement where the confines of the corporate office and buildings are shattered. Upon doing so, people from their homes and small offices can be participants in a true virtual organization where the telepresence organization becomes the central spoke of human social interaction and not the corporate building. Central to that organizational enablement are all the support tools essential to running a business embedded into an individual's telepresence terminal system and coordinated into a community of telepresence systems.

SUMMARY OF THE INVENTION

One embodiment of the present invention provides a dual robotic pan, tilt, and zoom camera that switches between cameras, eliminating viewing on a display of a moving camera image.

Another embodiment of the present invention provides a freeze frame camera system for eliminating viewing on a display of a moving camera image.

Yet another embodiment of the present invention provides each conferee with an interface to control camera presets.

An embodiment of the present invention provides a microphone for each conferee that does not encumber a table working surface.

Another embodiment of the present invention provides an interface for each conferee that does not encumber a table working surface.

An embodiment of the present invention provides a multipoint system for viewing a life-size conferee image positioned over an eye contact region and, also, displaying additional conferee window segments.

An embodiment of the present invention also provides a multipoint system for viewing a life-size conferee image positioned over an eye contact region and, also, displaying additional conferee window segments switched by activation with the life-size conferee image.

One embodiment of the present invention provides a telepresence projection display where a camera is aimed through an ambient light rejecting filter system.

Finally, an embodiment of the present invention provides telepresence organizational enablement system so that a plurality of telepresence terminals accesses and operates business organization functions.

The present invention enables a telepresence communication system for both group meeting rooms and personal systems in the home and office. Telepresence provides an improved human factor experience while conferencing, providing substantially life-size images with eye level placement of the camera. Specifically, the telepresence system provides switched presence interfaces so that conferees can select when they wish to send their image in a conference and, optionally, provides individual microphones for each of the conferees without cluttering the table working surface. Switched presence between presets of conferees are seen on multipoint windows designed to overlay life-size images upon eye contact camera regions and to eliminate seeing the camera image move during pan, tilt, and zoom operations. An ambient light rejecting filter system enables an eye level camera to be hidden behind a projection screen designed to provide high bright and high contrast images in normal meeting room and office environments. Lastly, a telepresence organizational enablement system brings all the features of a corporate office complex and its social and organizational benefits, into a virtual community and, thereby, eliminates the need to centralize employees in a building.

DESCRIPTION OF THE FIGURES

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 1 illustrates a prior art camera view of many distant conferees seen much smaller than life on a display;

FIG. 2 illustrates a prior art common multipoint stacked conferee arrangement;

FIG. 3 illustrates a prior art beamsplitter eye contact system;

FIG. 4 illustrates a prior art camera aimed through an LCD display for eye contact;

FIG. 5 illustrates a prior art image synthesis eye contact system;

FIG. 6 illustrates a prior art rear projection eye contact system;

FIG. 7 illustrates a prior art front projection eye contact system;

FIG. 8 illustrates the present invention with a camera preset button interface and microphone extending beyond a table edge;

FIG. 9 illustrates the present invention with a top mounted camera preset interface and microphone;

FIG. 10 illustrates the present invention with an edge mounted camera preset button interface and microphone;

FIG. 11 illustrates the present invention with a bottom mounted camera preset button interface and microphone;

FIG. 12 illustrates the present invention with a flush mounted camera preset button interface and microphone;

FIG. 13 illustrates the present invention hidden cable system for a camera preset button interface and microphone;

FIG. 14 illustrates the present invention with a reflected display eye contact terminal;

FIG. 15 illustrates the present invention with a reflected conferee eye contact terminal;

FIG. 16 illustrates the present invention with a multiple camera preset button interfaces in a room arrangement;

FIG. 25 illustrates the present invention with a telepresence array of an ambient light rejecting filter system with cameras mounted behind the screens;

FIG. 26 illustrates the present invention with a horizontal and vertical axes camera position and a camera concealment system;

FIG. 27 illustrates the present invention with a pan, tilt, and zoom camera positioned behind the ambient light rejecting filter;

FIG. 28 illustrates the present invention with a hole concealment system for an ambient light rejecting filter.

FIG. 29 illustrates the present invention with a rejection of ambient light from above, below, and from the right and the left.

FIG. 30 illustrates the present invention with a camera cable hole in the ambient light rejecting filter.

DETAILED DESCRIPTION OF THE INVENTION

Figure 17:
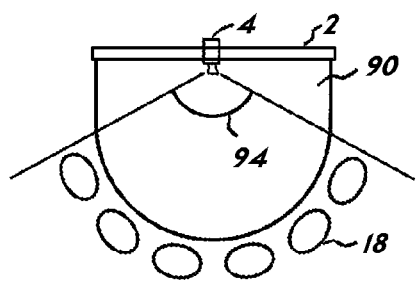
FIG. 17 illustrates the present invention with a horizontal camera capturing with a round shaped table.

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide an improved telepresence communication system Telepresence Communication System The present invention aims to create a fully enabled telepresence system from the terminal design to the network and the functionality of the terminals in the network. Telepresence, unlike videoconferencing, is specifically focused on substantially improving the human factor design and video quality of the communication experience. Common videoconferencing usually operates at a resolution far less than TV. Poor image quality affects the realism of the person imaged in display. All the embodiments of the present invention will operate with less then ideal image resolution, but it is a hallmark of good telepresence design to operate at HDTV resolutions. Several manufactures now offer HDTV codecs which have superb image quality. An eye level camera apparently hidden behind the eyes of the person on the screen is also a foundational aspect of good telepresence design. Also, life-size images of conferees greatly increase the sense that the other person imaged on the display shares the same meeting room and is apparently just sitting on the other side of the table. Still further, a telepresence system ideally is connected to similar systems that share a commonality in design. Telepresence also considers the totality of the functions of the communications experience and improving the productivity of the conferees.

In order to create substantially life-size images of conferees seen in display(s) "switched presence" is often the only choice due to display size constraints in smaller meeting rooms. As a matter of definition "substantially life-size image" means preferably life-size, but may be less then life-size or larger then life-size. To have 6 people on a screen life-size would require a display(s) roughly 12 feet wide. Such large displays are costly and may require multiple codecs. Also, many meeting rooms may not permit such a large display. Camera presets embedded in a manufacturer's remote controls are well known in the art. Usually a conference chairperson controls the remote control and selects who will talk by activating a preset on the remote control. This way "switched presence" is performed switching between conferees, much like watching a round table discussion on broadcast TV. Humans have become quite accustomed to seeing the world on TV with cuts and dissolves between images of people. The problem with switched presence is that it becomes very frustrating for everyone in the conference, because the chairperson has to be the director in charge of switching. Push-to-talk systems have been deployed in the past and connected to expensive control systems, so that each conferee can push a button on the table top to select their image for video transmission. These buttons and their cables are very cumbersome on the table tops.

It is a primary embodiment of the present invention is to provide a personal control interface 36 (FIG. 8) extending beyond a table edge 32 of a table 34. The table 34 can be any type of furniture, such as a boardroom table or a desk all having a working surface 50. A local conferee finger 38 activates a tight shot button 42, a wide shot button 46 and a microphone mute button 48. A microphone 44 is contained in the personal control interface 36 to pick up the voice of the conferee seated close to the personal control interface 36. The tight shot button 42 activates a camera preset that positions the conferee in a captured image in order to transmit a substantially life-size image. The wide shot button 46 activates a camera preset of two or more conferees for when many people are talking. The personal control interface 36 is designed to extend beyond the table edge 32, so that the table working surface 50 is not cluttered with cables and buttons. Also, the personal control interface 36 can be easily retrofitted to existing tables without the need for modifying tables or their working surface 50, such as drilling holes. The personal control interface 36, when mounted to the table 34, serves as a reference, so that the conferee knows where to sit at the table which is aligned to the camera presets. Additional button presets can be used on the personal control interface 36, such as a high tight shot for tall people, a low tight shot for smaller people, and any other camera angles desired (all not shown). Also, other button controls can be deployed to run other aspects of a conferencing system and conferencing room audio/visual environment (not shown).

Another primary embodiment of the present invention is housing the microphone in the personal control interface 36. Typically, microphones clutter the table working surface 50 or the microphone is placed into drilled holes that deface the table working surface 50. When one microphone is used per conferee having many microphone holes or many microphones on the working table surface 50, including the microphone cables, clutters the working surface 50 and effects conferees productivity. By embedding the microphone 44 into the personal control interface 36 all the clutter is removed from the table working surface 50.

The microphone 44 for each conferee enables voice activation to activate camera presets. The microphone closest to the conferee will pick up the voice of the conferee and a volume analyzer can determine the gating of the voice at that particular seat. Volume levels can be programmed to activate the camera presets only when a sufficient volume is reached at any particular microphone 44. Also, time response can be programmed so that the camera preset is activated only when a particular microphone 40 reaches a certain volume level for 3 seconds (as an example). This is helpful to avoid excessive camera preset switching when people are talking over each other or may cough. The personal control interface 36 may contain only the microphone 44 and have no buttons for manual activation of camera presets. In that case the personal control interface serves as the microphone 44 housing mounted to the table 34, yet extending beyond the table edge 32.

FIG. 9 illustrates the personal control interface 36 mounted to the table by a top mounted bracket 52 with glue (not shown). The personal control interface 36 can also be mounted directly to the table edge 32 by glue as seen in FIG. 10. Also, a bottom bracket 56 can be affixed by glue to the button on the table 34 with glue (FIG. 11). Any method to affix the personal control interface 36 to the table 34 can be used including screws. The primary embodiment of this invention is that the buttons and microphone 44 in the personal control interface 36 are positioned beyond the table edge 32 and, thereby, removing them from the working surface 50 of the table 34. The buttons and microphone 44 can be mounted flush with the table surface as seen in FIG. 12, mounted below the table edge 32 as seen in FIG. 13, and in the center of the table edge 32 as seen in FIGS. 9-11. FIG. 13 illustrates a primary embodiment of the invention where the button cable 58 and the microphone cable 60 are hidden under the table. Wireless microphone and wireless button technologies would eliminate the need for cables and readily integrate with the present invention. Also the personal control interface can be a slide mechanism and slide under the table 34 when not in use and then slide extending beyond the table edge 32 when in use (not shown).

FIG. 14 illustrates a primary embodiment of the present invention as a telepresence terminal that enables eye contact between conferees by reflecting the display 2 with the use of the beamsplitter 16 permitting the camera 4 to be aimed through beamsplitter 16 to capture the image of the local conferee 18. The camera 4 is configured as a pan/tilt/zoom camera and a second PTZ camera 62 is mounted above it (or to the side) and both cameras are aimed through the beamsplitter 16 to capture the image of the local conferee 18. The cameras are mounted behind the eyes of the reflection (not shown) of the distant conferee displayed on the display 2. The display 2 is mounted into a telepresence housing 64. The personal control interface 36 is mounted to the table 34 and the table is mounted in front of the telepresence housing 64. Alternatively, the personal control interface 36 could be mounted directly to the telepresence housing 64 and the table 34 would not be needed. Likewise, a table ledge could be affixed to the telepresence housing 64 that may also fold down (not shown).

The camera 4 and second PTZ camera 62 are each activated by the personal control interface 36. When many local conferees 18 each have their own personal control interfaces 36, the camera 4 will pan/tilt/zoom to that conferee's 18 location activated, and when it completes its robotic movements, the video signal will be released for transmission to the distant telepresence terminal. Then upon the next activation by another local conferee 18 upon the personal control interface 36, the second camera 62 robotically pan/tilts and zooms to its preset location of that local conferee 18, and when it completes its robotic movements, its video signal switches with camera 4's video signal for transmission to the distant telepresence terminal. The use of two PTZ cameras enables avoiding seeing the camera image move once it is activated. Not only is it poor videography to view a fast moving camera image, but it also can make a person feel sick from the fast camera image motion. The current embodiment overcomes the limitations of the use of a single PTZ camera. More then two PTZ cameras can be used. Also, activation can be by voice or manual. The switching can be hard cuts or dissolves or any image effect that transitions one image to another.

FIG. 14 illustrates a reflected display eye contact telepresence terminal. It may also be a reflected conferee eye contact telepresence terminal as seen in FIG. 15. The camera 4 captures a reflection of the conferee 18 upon the beamsplitter 16. A camera contrast shield 68 prevents light from reaching the camera from the opposite side of the beamsplitter 16 and, thereby, improves the reflectivity of the conferee 18. A controlled background shield 70 controls the reflection upon the beamsplitter 16 and may be black, full colored, have a static image or full motion images, 2-D or 3-dimensional in shape. Whether it is the eye contact display system of FIG. 14, FIG. 15, any prior art eye contact system, or any common videoconferencing system, the embodiments of the present invention are applicable. For example, the primary embodiments of the personal control interface 36 and the two robotic camera switching system of FIG. 14 are significant improvements to common videoconferencing systems, as well as eye contact systems. All the embodiments of the present invention are applicable to improve the diversity of eye level/eye contact display technologies, as well as common videoconferencing systems.

Display 2, as it is described herein, should be understood as any display technology that displays motion images and may be inherently an eye contact display device. This includes any type of 3-D display technology. The camera 4, as it is described herein, should be understood as any image pick up device that can capture a motion image of a conferee. This includes pan, tilt, and zoom robotic mechanisms, various resolution cameras, and various sizes of cameras from microcameras to HDTV broadcast cameras. The camera 4, as well, can have an imager with a higher pixel count then what is intended to be displayed. In such a case the camera 4 can select segments on the imager and then blow them up to fill a display. For example, a high resolution imager can have up to 8 preset locations in it for 8 conferees. The camera 4 need not then be robotic but rather moves to the preset camera angles with a stationary camera. All the relevant embodiments of the present invention lend itself to this type of camera imager system for presets and would interface well with the personal control interface 36. The beamsplitter 16 should be understood to include any type of reflective and transparent substrate, including solid substrates, such as glass and plastic, and flexible substrates, such as Mylar. A media display 66, as seen in FIG. 14, can be used for data collaboration and may also be touch screen. Preferably it is positioned between the conferee 18 and the display 2. It may though be mounted above, below or to the side of the display 2.

FIG. 16 illustrates another primary embodiment of the present invention. The personal control interface 36 operates wirelessly and via an infrared transmitter 70. The infrared transmitters 70 are received by an infrared receiver 82 on the camera 4 connected to a local codec 78 by a communication line 80. The infrared receiver 82 may also be affixed to the local codec 78 or connected by an extension wire with the infrared receiver 82 dangling at the end (not shown). In this embodiment, the personal control interface 36 is configured with the same infrared communication protocol as the codec manufacturer's stock infrared remote control. The interfaces 36 are then assigned preset camera positions and when activated transmit the command via the codec manufacturer's communication protocol for that camera preset. For voice activation, each interface may contain or separately be connected to a voice recognition system or a voice volume analyzer and, thereby, initiate the communication protocol for the camera preset associated to the particular local conferee 18 and his personal control interface 36. The local codec 78 may be a PC-centric codec device or an appliance based codec device.

FIG. 16 illustrates three various camera positions in relation to the display 2. The below camera position 72 captures an image of the local conferee 18 looking up. The above camera position 76 captures an image of the local conferee 18 looking down. The telepresence camera position 74 is located substantially at the eyes of the distant imaged conferee 84. The camera position 74 may be literally where the camera is placed or is enabled to appear to be emanating from the place on the display by the use a variety of eye contact technologies.

Figure 18:
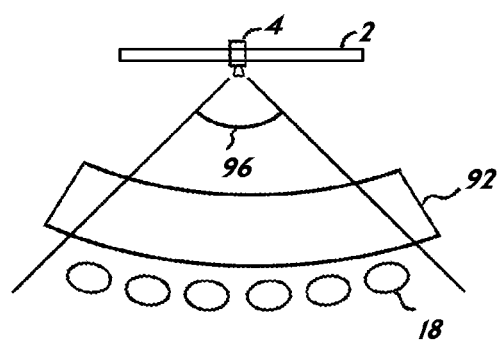
FIG. 18 illustrates the present invention with a horizontal camera capturing with a slightly curved table.

Another important consideration of camera placement is how it affects the direction a distant imaged conferee looks from left to right at many local conferees. This issue becomes more critical when several distant conferees are seen on a display screen in full life-size over a wide area. FIG. 17 illustrates a round table 90 with a wider camera angle 94 to capture all the local conferees 18 with the camera 4. FIG. 18 illustrates a slightly curved table 92 with a narrower camera angle 96 to capture all the local conferees 18 with the camera 4. By adjusting the meeting table shape, the size of the screen, the number of imaged distant conferees and the number local conferees, the left to right eye gaze can be calibrated to improve the left to right eye gaze direction between all the conferees. The same consideration applies if two cameras are used where one camera captures images of one side of the table and the other camera captures the other half of the table (not shown). Also, the display 2 can be curved at differing arcs to adjust the appearance of the direction the distant imaged conferees 84 are looking from left to right (not shown).

Figure 19:
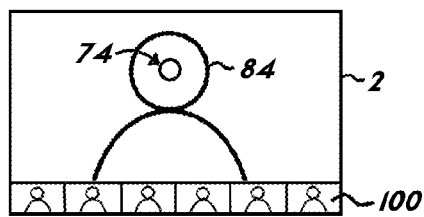
FIG. 19 illustrates the present invention with a multipoint layout optimized for eye contact telepresence.

In a further embodiment of the present invention to provide switched presence for multipoint that includes telepresence eye gaze. FIG. 19 illustrates a novel multipoint layout configured for telepresence multipoint communication where the distant imaged conferee 84 is substantially life-size and whose eyes are in the same area as the camera position 74. A bottom window row 100 shows several distant conferees.

Figure 20:
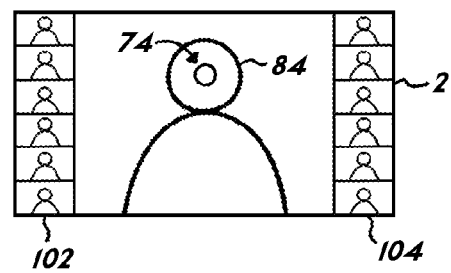
FIG. 20 illustrates the present invention with a multipoint layout optimized for eye contact telepresence.

FIG. 20 illustrates another novel multipoint layout configuration for telepresence with a substantially life-size distant conferee 84. A left window row 102 and a right window row 104 present several distant conferees. Most importantly, a life-size distant imaged conferee 84 is displayed with the camera position 74 in his approximate eye area.

Another embodiment of the present invention switches multipoint windows upon manual control or voice activation. Thereby, the substantially life-size image automatically switches with the smaller images. Each conferee can also override the voice activation switching and select the person they wish to see substantially life-size and in the camera position 74. If two conferees are speaking back and forth quickly the system may default to show two images side by side. The multipoint control is preferably included into the personal control interface 36 but may be any type of interface including a computer program operating on a PC or a remote control. In the case of the computer program, each conferee may access a multipoint control device 106 (FIG. 21) via the web, a private data network and, also, through the codec using industry or manufacturer's communication protocols. To further enhance the experience when a particular conferee wishes to address another particular conferee, a highlight system can be activated by the conferee which highlights a particular conferee window at all terminals so that all conferees know that the speaking conferee is addressing a particular person in the conference. A touch button interface has been created so that a particular window can be activated quickly. All the conferee windows can be seen on a separate display, such as the media display 66, as seen in FIG. 14 where the touch screen can control the multipoint session by tapping a particular window with a conferee image. In that case, the display 2 need not display any images except for the substantially life-size distant imaged conferee 84 with his eyes over the camera position 74. Alternatively, each conferee window can be displayed on its own individual display.

Figure 21:
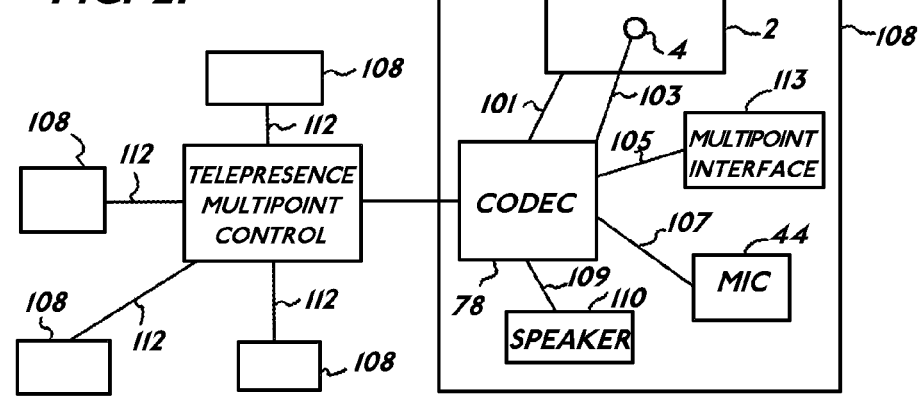
FIG. 21 illustrates the present invention as a system block diagram for multipoint telepresence.

FIG. 21 illustrates the multipoint embodiment of the present invention as it is configured within a total network of telepresence terminals. A telepresence terminal 108 contains, at minimum, the display 2 connected to the local codec 78 by a display line 101, the camera 4 connected to the local codec 78 by camera signal line 103, the microphone 44 connected to the local codec 78 by a microphone line 107, and a speaker 110 connected to the local codec 78 by a speaker line 109. A generic multipoint interface 113 connected to the local codec 78 by an interface line 105, enables manual activation of switching the image of the substantially life-size distant imaged conferee 84 with the smaller windows. The generic multipoint interface may be the personal control interface 36, the media display 66 or any type of manual interface. The microphone 44 can alternatively be used as the activating system for image switching between conferees as described previously.

The telepresence terminal in a primary embodiment of the present invention enables the camera 4 to be positioned literally at a distant conferee's 84 eye level or appearing to emanate from the distant conferee's 84 eye area by the use of one of several eye contact technologies. The telepresence terminal 108 is connected by a network line 112 to the multipoint control device 106. Connected to that device are many other telepresence terminals 108 configured in commonality to form a virtual telepresence community. The telepresence terminals 108 may be large group systems or a system used by one person in his office. The terminals 108 may be located at corporate buildings and/or homes. No matter where they are located they form a virtual telepresence community. The multipoint control device 106 is seen in FIG. 21 as separate from the terminals 108 forming a central spoke of a network. The multipoint control device 106 may be located in a network operation center where other services are provided to the virtual telepresence community such as scheduling and bridging. The device may also be built into just one of the local codecs 78 which enables multipoint to many sites. Other network architectures not shown are, as well, applicable, such as a separate data connection for controlling the multipoint control device 106 or for data collaboration (not shown).

Figure 22:
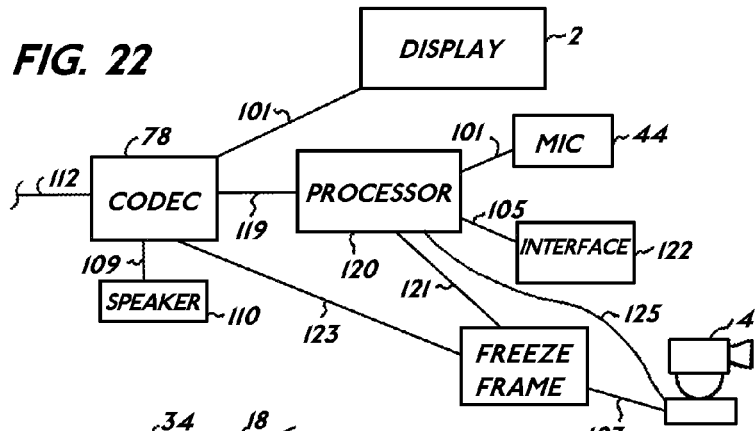
FIG. 22 illustrates the present invention as a block diagram for freeze frame images, while a robotic camera moves to a preset location.

FIG. 22 illustrates another primary embodiment of the present invention where a single camera 4 can robotically pan, tilt, and zoom to differing presets and the conferees do not see the image move. The dual camera system as explained for FIG. 14 may be cost prohibitive for some applications. In that case, the single camera 4 that robotically pans, tilts, and zooms is configured to create a clean image cut or dissolve while transitioning between one preset and another. A processor 120 receives preset activation information from a general control interface 122 or from the voice of the conferee 18 from microphone 44, and the processor engages the camera 4 preset while also engaging a freeze frame device 124 that freezes the camera 4 video image signal during the time the camera is moving. A camera control line 125 connects the processor 120 to the camera 4 initiating the robotic movements. The freeze frame device 124 is triggered by the processor 120 via processor line 121. An outgoing video signal line sends the video stream and the temporary frozen video to the local codec 78. If the camera 4 takes one second to move between the preset location, then the video signal will be frozen approximately for 1 second. Certainly, the faster the robotic movement, the cleaner this transition will be. A dissolver can also be included (not shown) so that the freeze frame is used in the dissolve compositing and, thereby, reducing the appearance of a frozen image. A media bundle wire 119 connects the processor 120 to the codec 78.

Figure 23:
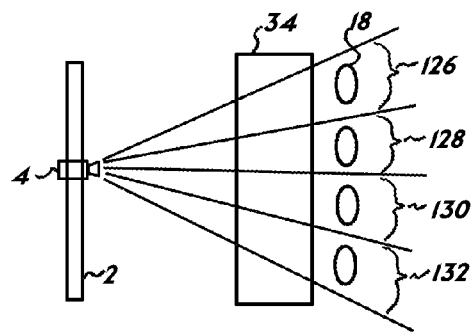
FIG. 23 illustrates the present invention with one camera and two cameras switched telepresence configurations as seen from a bird's eye view.

FIG. 23 illustrates a common set of presets as applicable to switched presence. Four local conferees 18 are seated at the table 34. Each conferee is positioned into a preset of the camera 4. A first preset 126, a second preset 128, a third preset 130 and a fourth preset 132 are each associated with a particular local conferee 18. The camera 4 is one or more robotic camera(s) or smaller image segments upon a larger camera imager that is stationary and will enable the transitioning between camera 4 image presets.

Construction of the telepresence terminals 108 of the present invention may be adapted to various user applications. Two Sony BRC 300 robotic pan, tilt, and zoom cameras, a Sony G70 codec, and an AMX audio/visual control system has been developed to achieve terminal functions as described in this patent. The personal control interfaces 36 were fabricated from milled aluminum and a custom membrane switch was affixed to it. The microphone was a Countryman model B6 (Menlo Park, Calif.) built into each personal control interface 36. Customized programming enabled the two BRC 300 cameras to work alternating between presets, so that the camera panning and tilting are not seen. A common dissolver was also included in a particular configuration to transition preset images. A Codian Inc. (San Jose, Calif.) multipoint control device MSE 8000 was used with a specific multipoint window layout created for the telepresence terminals, so that a substantially life-size image could be seen and switched over an eye contact camera position in relation to a Pioneer PDP 505 CMX plasma display. Several eye contact means have been developed as a part of the terminal 108. In particular, a Digital Video Enterprises, Inc (Irvine, Calif.) Telepresence 50 eye contact system was used which utilizes a beamsplitter to reflect the image of the display. Microphone gating and voice activation was provided by programming a ClearOne (Salt Lake City Utah) XAP 800 audio management and distribution system.

A primary embodiment of the present invention is to create a telepresence organization that exceeds the productivity of housing employees in corporate buildings. The telepresence terminal 108 combines substantially life-size images, eye contact, high quality audio and video, and an experience as if the imaged conferee is sitting on the other side of the desk or table. The telepresence organization is a total system that is designed for organizational enablement where essential business tools are integrated seamlessly into the telepresence terminals 108 and, thereby, the confines of traditional organizational structure, based upon real estate, shifts to a telepresence organizational system. Upon doing so, people from their homes and small offices can congregate into true virtual organizations where the telepresence organization becomes the central spoke of human social interaction and not the corporate building. Central to that organizational enablement are all the support tools essential to running a business embedded into an individual's telepresence terminal system and coordinated into a community of telepresence systems.

Figure 24:
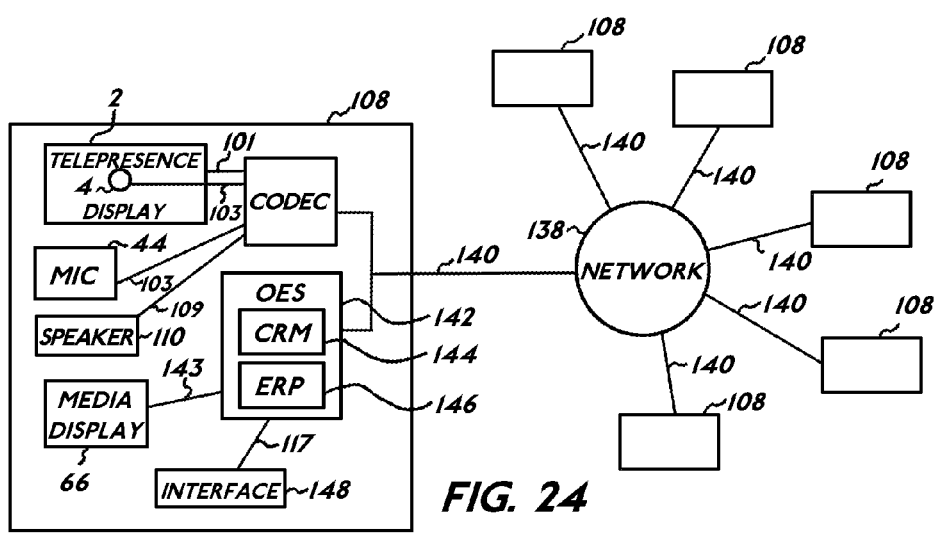
FIG. 24 illustrates the present invention as a block diagram of an organizational enablement system.

FIG. 24 illustrates a telepresence organization where there is a community of telepresence terminals 108 are geographically dispersed and connected to a network 138. The terminals 108 access the network 138 by a network access line 140 which may be fiber-to-the home, DSL, satellite, WiMax, and any data connection means. The network 138 is one of the public internet, internet 2, a private network or other types of network. Preferably, the network has a quality of service, so few data packets are lost. An optional second network may also be connected for data collaboration or other functions (not shown). A second network offers a redundancy in case the first network should become inoperable for whatever reason. So the network 138 should be considered a connectivity means that may have architecture different than what is seen in FIG. 24, yet remains within the scope of the invention. Also, connected to the network 138 may be a telepresence network operation center where multipoint and bridging services are provided, as well as other services. Live service operators can provide high-touch to the high-tech environment and assists with many service based needs from being an on-telepresence line concierge to an on-telepresence line technical help desk. Entire communities may share the network where subscribers offer each other services, as well.

At the heart of the telepresence organization is an "Organizational Enablement System" OES 142. Most all of the primary business function tools that operate an organization in a building are transferred now to the telepresence terminals 108. As a result, the telepresence terminals 108 all operate interactively within a telepresence community. Fundamentally, two components are needed to create an effective OES and they are a Customer Resource Management "CRM" 144 and Enterprise Resource Planning "ERP" 146. In one configuration the telepresence terminal 108 has a computer that effectively is the hardware component of the OES 142 of which software performs the CRM 144 and the ERP 146 functions. The OES 142 is connected to the network 138, so all the telepresence terminals 108 with the OES 142 interactively operate. The OES 142 is controlled by an interface 148, such as a keyboard and a mouse, and connected to the OES 142 by an OES interface line 117 enabling each terminal 108 to perform organizational tasks that otherwise would have been conducted in person in a corporate building. The telepresence terminal 108 is the social link to create the virtual telepresence community where the quality of the experience is aimed to be just as good as being there in person.

Common data collaboration is well known in the videoconferencing field. It includes the ability to see one another's documents and collaborate on those documents. The OES 142 is not a simple data collaboration tool, but rather a data organizational tool to assist an organization to perform its primary business productivity functions task by task and even tailored to a specific employee's job. The CRM 144 and ERP 146 perform their functions in conjunction with the interactive visual and auditory communication provided by the telepresence terminal 108 to create a total system. The CRM 144 provides data organization for sales force automation, support for management, marketing campaign management, partner management, and order management. The ERP 146 provides data organization for shipping, receiving, purchasing, payroll, inventory, and financials. All conferees share the interactive data organizational business tools creating a commonality of shared resources over the network 138. Each telepresence terminal 108 can have a customized dashboard (not shown) which may be employee and job specific, such as an executive dashboard that has access to critical corporate financial metrics that would not be accessible by people with other jobs. The dashboard can be seen on the display 2 or on another display such as the media display 66 connected to the OES 142 by a second display line 143. Software that provides CRM 144 and ERP 146 is available from HP Corporation and is called OpenView which is a business management and process software. This software and others like it have been integrated into the telepresence terminal 108 and has enabled entire virtual organizations to exist without the need for a corporate building. The potential in financial savings and increased productivity for a fully enabled telepresence business is dramatic over real estate based businesses. Conceivably, the telepresence terminal 108, the network, and the OES 142 are offered as a turnkey package to businesses that want to embrace a telepresence organizational business model. Governments and educational institutions can, as well, benefit from the OES 142 integrated with the telepresence terminal 108.

Still further embedding the OES 142 into the scheduling and call features of the codec can create a further enhancement to a telepresence organization. In one configuration the OES 142 and the local codec 78 are connected by a data line 115, which is one, among other methods, to integrate the local codec 78 with the OES 142. Calling features can be included in dashboards so the conferees need only navigate a single graphical user interface for the organization. Still further, virtual environments can be created to the look and feel of a virtual building. For example, a 3-D animated building can contain offices, meeting rooms, a lobby, and so forth. For example, a middle level manager conferee seeks to speak to an executive, he may, when calling that number, actually see the executive suite in a 3-D environment and can navigate the hallways and knock on that executive's door by a mouse command. Upon entering the executive suite, it may also be a virtual environment where the executive is located and whose real image is seen in the virtual environment. A simple green screen software program, or other background replacement technologies, can now achieve high quality chroma-keying type effects. The current system utilized the Ultra product sold by Serious Magic (Folsom, Calif.).

In one embodiment, the telepresence terminal 108, in its expanded definition, as explained for FIG. 24, enables a virtual office complex that is entirely in cyberspace that permits the quality of social interaction of being with people in person, made possible by effective the telepresence terminal, high quality video, data collaboration, and the organizational enablement system 142 for organizing data so that conferees can interact and perform essential business activities in one integrated network system with telepresence terminals that have a commonality in design. Still further, the OES 142 may also provide additional services, such as e-commerce management, including website, web store, customer portal, and a vendor portal.

FIG. 25 illustrates an ambient light rejecting screen 152 configured to function as an immersive telepresence system. Common front projection screens include simple white, grey, beaded, and reflective type surfaces. These common projection screens require the room light to be dimmed to a point where the projected images can be clearly seen and the images have high contrast (black levels). Unfortunately, the room lights must be dimmed so much that a meeting room environment becomes nonfunctional for common meeting tasks due to lack of ambient light. Also, the dark room does not permit effective image capturing of the conferees in the room for transmitting to the distant site. As a result, large screen videoconferencing rooms have relied on rear projection screens, because of its ability to maintain acceptable levels of brightness and contrast. Rear projection pathways for large images, such as 10 foot diagonal, require very deep cavities to house the optical pathway. These rear projection systems are also very expensive to build and install. Still further, large rear projection systems do not have an effective place to position the camera in the eye region of imaged conferees since the camera would interfere with viewing of the image. The camera could be placed behind the rear projection screen and shot through a hole, but the camera would cast a shadow in the projection beam path creating a larger area beyond that of the hole with no picture.

A further embodiment of the present invention is to create a telepresence terminal array 150 that overcomes the limitations of rear and front projection of the prior art. While the prior art does disclose pinhole cameras and the like behind holes in front projections screens is does not provide a means to achieve a high contrasts and high brightness front projected image that is viewable in a brightly lit room environment. The present invention utilizes selective angle ambient light rejecting optical elements integral to a front projection screen. FIG. 25 illustrates the use of an ambient light rejection screen 152 (herein referred to as ALR screen 152) that is front projection. Several technologies enable ambient light rejection which has ambient light rejection filters combined with reflective elements to display the projected image. Such technologies include, for example, tiny micro-louver layers that reject unwanted ambient light from various angles. Micro-louvers, if oriented at 90 degrees to the projection screen, reject ambient light from two directions. A second micro-louver layer can be added and oriented in the opposite direction and block out ambient light from two other directions. So the louvers are configurable to block ambient light from the top, bottom, left, and right of a reflective screen surface. Upon inspection, these screens usually appear reflective when viewed from the projector's perspective, but when viewed obliquely they become less reflective and even dark in color.

Most significantly is a commercially available multi-layered optical screen called Super Nova manufactured by DNP Inc. (San Diego, Calif.), which serves as an excellent choice for the present invention. This particular screen features an ambient light rejecting high contrast filter(s) which covers 60% of the screen surface and permits the projected image to be reflected from the screen and absorbs incident room light from angles other than the direction of the projection beam. When the image is projected onto the screen, it passes through an optical lens system, which focuses and concentrates the projected light before it is reflected back towards the viewers.

The lens system comprises a contrast enhancement filter that absorbs incident light from windows and room light. As a result, the screen is highly resistant to ambient light. ALR screens 152 may use, for example, holograms or polarized-light-separating layers as described in Japanese Laid-Open Patent Publications No. 107660/1993 and No. 540445/2002. As seen in FIG. 25, the telepresence terminal array 150 contains two ALR screens 152, each imaging four distant imaged conferees 84 for a total of 8 imaged conferees 84 seen on the telepresence terminal array 150. The two ALR screens 152 can share the same vertical plane (together flat) or, as shown, angled to each other for improving viewing by the conferees 18 to reduce oblique viewing of the ALR screens 152 from various conferees' viewing positions. Also the angled relationship of the ALR screens 152 can be adjusted to optimize the left and right eye gaze direction (see FIGS. 17 and 18). The screens can also be curved, as well as forming an arc shape. It is to be expressly understood that the present embodiment of the use of the ALR screen 152 may be one or many screens side-by-side. It is further to be expressly understood that one or more distant imaged conferees 84 can be imaged upon the ALR screen 152. In the case of several screens, they can be seamed together in a manner to minimize the visible seam, such as micro-tongue and groove connections among other connection methods. Based on telepresence parameters, life-size images are preferred. Smaller than life images my be acceptable for some configurations, such as showing two distant imaged conferees 84 in a single 50" diagonal size 16:9 aspect ratio ALR screen 152 (not shown).

A primary embodiment of the present invention is to provide holes in the ALR screen 152, so that a camera can be aimed from behind the ALR screen 152 and through a hole 154 to capture the image of the local conferee(s) 18. A hole position 156 permits a camera 4 (not seen) to shoot through the hole 154 and capture the image of one or more local conferees 18. An additional hole position 158 allows another camera 4 (not seen) to capture the image of one or more other local conferees 18. A fixed camera system (preset to capture a portion of the seats in the room) may permit the capture of four conferees 18 corresponding to the display of four distant imaged conferees 84 per each ALR screen 152. Hence, the telepresence terminal array 150, as shown in FIG. 25, will permit a total of 16 conferees to interact. The telepresence terminal array 150 will then ideally communicate to a distant site with a second telepresence terminal array 150, so that the conferees can simply experience a window into another room without having to deal with camera presets and image switching. The connection can also be "always on" so a conference is engaged just as simply as walking into a room and starting to converse. Larger and smaller terminal configurations that use the ALR screen 152 may use one or more ALR screens 152 and display one or a multitude of distant imaged conferees 84 (such as a classroom or tiered seating with rear rows (not shown)).

Another embodiment is to provide a position hole 160 for the hole 154 in the center of telepresence terminal array 150. One camera 4 can be positioned to aim through the hole position 160 and capture all eight local conferees 18 or two cameras 4 can capture four local conferees 18 on the left side and the other four conferees 18 on the right side. The distant telepresence terminal array (not shown) would have a similar one camera 4 arrangement or two camera 4 arrangements for a complete interoperable connected system. An advantage of capturing images from the position hole 160 is that there would be no image overlap in the background as compared to using two cameras separated from one another as is in the case of position hole 156 and 158. More cameras 4 can be added, as well as additional codecs. Conceivably, there could be one camera per local conferee 18 and projected images are blended together to create the appearance that all conferees are sharing the same meeting room.

A primary embodiment of the present invention, as seen in FIG. 25, is to enable the camera 4 to be aimed through the ALR screen 152 at eye level and, thereby, capture a straight on view of the local conferees 18. Common videoconferencing rooms mount cameras either above or below common rear and front projection screens and so the image of the conferees 18 are captured looking down or looking up, which is a significant distraction during telepresence communication. The camera(s) 4, in several configurations of the present invention, take into account horizontal gaze direction from left to right (also see FIGS. 17 and 180). Optimizing the camera(s) 4 for gaze direction depends on such factors as the number of ALR screens 152 in an array, the size of the screen(s), the number of cameras, and the size of the distant imaged conferees 84.

A first common projector 162 is projected upon the ALR 152 screen to the left of the telepresence array 150 and a second common projector 164 is projected upon the ALR screen to the right of the telepresence array 150 (right and left from the local conferee's 18 point of view). The projectors can be any type of projector, such as LCD and DLP, and may include configurational upgrades, such as 3-D projectors. The common projectors 162 and 164 are seen built into an oblong table 166. The common projectors 162 and 164 can, as well, be mounted on the back wall behind the local conferee(s) 18, the ceiling, resting on top of a table/desk, and in or on its own cart (all not shown), to name only a few. Though two common projectors 162 and 164 are shown in FIG. 25, configurations with one or many projectors projecting upon one or many ALR screens 152 are applicable to the present invention.

The telepresence terminal array 150 is optionally configured as a support housing that holds into position the ALR screens 152. A cavity door 168 is removable to have access to an equipment chamber (behind door 168) that holds at least the camera 4 and other gear, such as a codec (not shown). The ALR screens 152 may also open up with side hinges 170 so that the entire equipment chamber is exposed for easy access. The telepresence terminal array 150, whether configured with one or more ALR screens 152; can be configured as hang on the wall, self standing, built into furniture, collapsible, foldable, built into walls, robotically moves from a wall position toward a conference table and back, and rolls on wheels for ease of transport.

The telepresence terminal array 150 is ideal for creating a virtual window with another distant room. When the room environment can be fully seen on the large ALR screens 152, the rooms can be architecturally designed to be the same with matching colors, tables, and other environmental design elements. Matching wall colors and tables in corporate conferencing rooms has been done since the dawn of the conferencing industry 25 years ago. One advantage of the present invention is that rooms may retain their own unique appearance, in some respects, so that costs of installation are minimized. Ultimately, the goal is to achieve a quick installation at the lowest cost. Custom room lighting may be an upgrade. The media display 66 can be mounted above, below, to the side, and in front of the telepresence terminal array 150. The media display(s) 66 can also be built into or rest on top of the oblong table 166. The oblong table 166 may be any type of shape and can be placed up to the telepresence terminal array 150 creating a feel as if a real table extends into an imaged table 172.

FIG. 26 illustrates a horizontal axis 180 intersecting from left to right of an eye region 182 of one or more distant imaged conferees 84. The horizontal axis 180 could intersect from one to twelve or more distant imaged conferees 84 in the eye region 182. The hole 154 is cut approximately on the horizontal axis 180 line with in the eye region 182. The hole 154 permits a camera 4 (not shown) to shoot through the hole 154 and capture an image of the local conferee 18. One hole 154 is illustrated cut into the ALR screen 152 and there can be two more holes 154 (not shown) cut into the ALR screen 152 depending upon the terminal configuration with additional cameras 4. The hole 154, with the camera 4 behind, can be situated anywhere along the horizontal axis 180 including between the distant imaged conferees 84 and behind the image of the distant imaged conferee 84. A vertical axis 184 determines the position of the hole 154 from top to bottom of the ALR screen 152. Depending upon the particular configuration, the horizontal axis 180 may adjust up or down along the vertical axis 184 and thereby moves the hole 154 and the eye region 182 up or down.

If it is desired to show a large portion of the room, the distant imaged conferee(s) 84 are displayed in the lower portion of the ALR screen 152 and, thereby, lowering the horizontal axis 180 and the eye region 182. In such a case, distant imaged conferees 84 that is standing up can be clearly seen. In configurations where a bust shot of the distant imaged conferee(s) 84 are seen, then the horizontal axis 180 would adjust along the vertical axis 184 upward raising the hole 154. Preferably, the distant telepresence terminals and the local telepresence terminals that are connected and communicating with each other have a similar configuration with a similar position of the horizontal axis 180 along the vertical axis 184. At times it may be desirable to move the camera 4 upon a track or have multiple cameras 4, so that the camera 4 may capture the image of the local conferee 18 from differing perspectives to enhance a greater sense of telepresence. This is especially desired when multiple cameras 4 are capturing multiple local conferees 18 while they are viewing multiple distant imaged conferees 84. For example, two or more cameras 4 would be positioned differently along the horizontal axis 180 (closer or further apart) depending upon how many distant imaged conferees 84 and local conferees 18 are in a particular meeting at any given time.

FIG. 26 further illustrates the hole 154 concealment method utilizing a local room prop 186 in a local conferee background 188, captured by the camera 4 (not shown) through the hole 154. The local room prop 186 is positioned to correspond to the distant conferee terminal with a similar configuration and, thereby, assist in concealing the distant camera hole 154 (distant terminal not shown). The distant terminal then transmits a corresponding distant room prop 190 that is displayed among the hole 154 on the ALR screen 152. In so doing both the local and the distant terminals can conceal the holes 154 in the ALR screens 152 from the view of the conferees. The room prop 186 may be as simple as an area of dark colored paint or more elaborately a part of a milled wood wall cabinet or a custom graphic. For example, if the hole 154 appears dark, then the distant terminals corresponding distant room prop 186 would be dark in color, so that the local conferee(s) 18 would have a difficulty discerning the hole 154. Other concealment methods can, as well, be used, such as a one way mirror (not shown) permitting the camera 4 to be aimed through it and placed over the hole 154. In that case the distant room prop 190 displayed in the image containing the hole 154 would have a similar appearance as the one way mirror. Those skilled in the art will appreciate various artistic ways to use room props to conceal the hole 154 as described above.

FIG. 27 illustrates the ALR screen 152 fabricated with a screen substrate 192 and an optical layer system 194. The optical layer system 194 has one or more layers of optical elements that create the directional ambient light rejection functionality of the ALR screen 152. The optical layer system 194 may include directional filters, lenses, reflection layers, contrasts enhancement filters, glare reduction filters, polarizing layers, holographic layers, and liquid crystal layers all designed to reject ambient light and thereby increase image contrast and brightness of the ALR screen 152. As seen in FIG. 27—the hole 154 is cut through the screen substrate 192, as well as the optical layer system 194 permitting the camera 4 to capture an image of the conferee 82 through the hole 154 passing by the screen substrate 192 and the optical layer system 194.

FIG. 27 illustrates the camera 4 configured as a robotic pan, tilt, and zoom camera. The zoom functionality is internal to the camera. The pan, tilt, and zoom functionality can be accessed remotely by the distant imaged conferee 84 at his distant terminal or by the local conferee 18. Those skilled in the art will appreciate the various cameras that will readily integrate with the present invention. Certainly, the smaller the camera 4 the better which minimizes the size of the hole 154. Pinhole cameras and lipstick cameras will readily integrate into the present invention, as well as any video pickup device and micro-video pickup device. Also, moving tracks (not shown) can move the camera 4 to differing locations behind the ALR screen 152. In such a case, the camera 4 may have several holes 154 of which to aim through or the hole 154 may be a open long slot.

FIG. 28 illustrates the use of a transparent hole cover 196 that assists in concealing the hole 154 from the local conferee 18, while the camera 4 is capturing images through the hole 154 and the transparent hole cover 196. The transparent hole cover 196 may be any medium that permits the local conferee 18 image to be captured through the transparent hole cover 196, yet conceals the camera from local conferee's 18 perspective. Concealing the camera 4 from the local conferee 18 has a psychological impact so the conferee 18 forgets they are on camera and thereby is more comfortable using the telepresence system. Preferably the transparent camera hole cover 196 reflects projector light, so that it blends in with the image on the ALR screen 152. The transparent hole cover 196 may be technologies, such as scrim, a one way mirror, a polarizing element, a holographic element or a beamsplitter. Still further, the medium of the transparent hole cover 196 may be one or more layers of, the optical layer system 194. Because of the delicate nature of the optical layer system 194 it can be affixed to a clear substrate to reduce the possibility of being punctured. When the ALR screen 152 is not used for displaying the image of the distant imaged conferee 84 it may be desirable to place a screen hole plug (not shown) into the hole 154. Ideally, the screen hole plug would be a small piece of the ALR screen 930 that, when inserted into the hole 154, the hole 154 and the seams around the insert in the ALR screen 152 are nearly invisible to the local conferee(s) 18. Still further, the screen hole plug can be mechanically positioned from behind the ALR screen 152 into and away from the hole 154 and optionally remotely activated with an automated mechanism (not shown).

The telepresence terminal array 150 can communicate simultaneously with two or more distant locations. Portions of several distant locations can appear in portions of the ALR screens 152. For example, a tight bust shot of one conferee, which is ideal for personal system, may be imaged processed to be displayed as if in a meeting room with many other conferees on larger telepresence arrays that display multiple life-size images of conferees at the same time. Also, multi-point windows can be deployed as required and desired for a particular configuration. Also, image switching between sites has also been utilized. Voice activation and manual switches have been deployed including switch command control for every conferee as described through the present invention.

FIG. 29 illustrates the ambient light rejecting properties of the ALR screen 152. In a preferred embodiment, the ALR screen rejects ambient light, caused by window light and room fixture lighting, from more then one direction. Ambient light impinges the ALR screen 152 to a left side 208, a right side 202, a bottom side 204, and a top side 200. Ideally, the ALR screen 152 rejects ambient light from at least two directions and preferably from all four directions. Conceivably, portions of light aimed straight on to the screen could also be rejected by the ALR screen 152.

FIG. 30 illustrates another configuration of the present invention. A micro hole 210 is bored through the screen substrate 192 and the optical layer system 194 and passes through it a camera video/power cable 212. The camera 4 is a micro camera affixed to the optical layer system 194. The camera 4 may be concealed by its color and the body of the camera may reflect projection light and even be covered in the optical layer system 194. The camera 4 and the hole 154 concealment methods described for FIGS. 26 and 28 are applicable to this configuration. A lens and/or a body of the camera 4 (not numbered) may be on the projector side of the ALR screen 152 while the video/power cable 212 is a part of the camera 4 and is located on the opposite side of the ALR screen 152. The video/power cable 212 may also be hidden behind the optical layer system 194 and is channeled to a side of the screen rather then exiting out the opposite side of the ALR screen 152. Likewise the camera video/power cable 212 can be micro thin and is affixed to the surface of the optical layer system 194 and exit to a side of the screen.

Another embodiment of the present invention is to create a mobile telepresence sales tool where the terminal 108 operates via a wireless urban network, such as WiMax. Also, optionally, a battery can be built into the terminal, so that it can be transported upon wheels anywhere where the wireless connection can be made. On-site customer presentations can be achieved quickly and easily without the hassles of getting connectivity. A telepresence rental system can also be created where the terminals are rented or leased for a short period of time. Monetary transaction systems can be incorporated into the telepresence terminal for temporary use or can be by an operator, who takes a credit card number, for example. The telepresence terminal 108 can also be built for specific uses, such as in ships' quarters, in police squad cars, in mobile command and control centers, to name only a few potential applications.

The following claims are thus to be understood to include what is specifically illustrated and described above, what is conceptually equivalent, what can be obviously substituted and also what essentially incorporates the essential idea of the invention. Those skilled in the art will appreciate that various adaptations and modifications of the just-described preferred embodiment can be configured without departing from the scope of the invention. The illustrated embodiment has been set forth only for the purposes of example and that should not be taken as limiting the invention. Therefore, it is to be understood that, within the scope of the appended claims, the invention may be practiced other than as specifically described herein.

We claim:

1. A telepresence system for connecting a plurality of local conferees with a distant conferee, the system comprising:
   a local telepresence terminal, having a first codec for encoding video and audio of the plurality local conferees and decoding video and audio of the distant conferee, a first image display for producing an image of the distant conferee, a first speaker to produce the voice of the distant conferee, and a first video camera capturing an image of the local conferees;
   a plurality of personal control interfaces, one for each of the plurality local conferees, the interfaces each associated with manually activating a selection of a single local conferee image, captured by the first camera, among the plurality of local conferees, thereby switching image capturing between the selection of each of the plurality of local conferees, the plurality of personal control interfaces mounted to the table and extending beyond an edge thereof with each of said plurality of personal control interfaces mounted to at least one of a bottom surface of the table or the edge of the table; and
   a table around which the plurality of local conferees are sitting, so that each of the plurality of local conferees can easily access their interface.

2. A telepresence system for connecting a local conferee with a distant conferee, the system comprising:
   a local telepresence terminal, having a first codec for encoding video and audio of the local conferee and decoding video and audio of the distant conferee, a first image display for producing an image of the distant conferee, a first speaker to produce the voice of the distant conferee, and a first video camera capturing an image of the local conferee;
   a table at which the local conferee is sitting; and
   a microphone housing in which at least one microphone is contained mounted to at least one of a bottom surface of the table or the edge of the table, wherein at least one of a microphone audio signal cable and a microphone power cable is located under the table so as not to obstruct a working surface of the table.

3. A telepresence system for connecting a plurality of local conferees with a distant conferee, the system comprising:
   a local telepresence terminal, having a first codec for encoding video and audio of the plurality local conferees and decoding video and audio of the distant conferee, a first image display for producing an image of the distant conferee, a first speaker to produce the voice of the distant conferee, and a first video camera capturing an image of the local conferees;
   a plurality of personal control interfaces one for each of the plurality local conferees, each interface containing a microphone to capture the voice of the local conferee associated with that interface, the interfaces each associated with manually activating a selection of a single local conferee image, captured by the first camera, among the plurality of local conferees, thereby switching image capturing between the selection of each of the plurality of local conferees, the plurality of personal control interfaces mounted to the table and extending beyond an edge thereof with each of said plurality of personal control interfaces mounted to at least one of a bottom surface of the table or the edge of the table;
   a table around which the plurality of local conferees are sitting so that each of the plurality of local conferees can easily access their interface;

a plurality of infrared transmitters one for each of the plurality of personal control interfaces, the transmitters transmitting the selection upon the activation of the interface; and an infrared receiver connected to at least one of the first camera and the first codec, for receiving the transmitted selection.

4. A telepresence system for connecting a plurality of local conferees with a distant conferee, the system comprising:

a local telepresence terminal, having a first codec for encoding video and audio of the plurality local conferees and decoding video and audio of the distant conferee, a first image display for producing an image of the distant conferee, a first speaker to produce the voice of the distant conferee, and a first video camera capturing an image of the local conferees;

a plurality of personal control interfaces one for each of the plurality local conferees, the interfaces each associated with manually activating a selection of a single local conferee image, captured by the first camera, among the plurality of local conferees, thereby switching image capturing between the selection of each of the plurality of local conferees, the plurality of personal control interfaces mounted to the table and extending beyond an edge thereof with each of said plurality of personal control interfaces mounted to at least one of a bottom surface of the table or the edge of the table;

a table around which the plurality of local conferees are sitting so that each of the plurality of local conferees can easily access their interface;

a plurality of camera preset positions activated by at least one of voice activation and manually;

a motorized camera adjustment system for at least one of panning, tilting and zooming the camera and engaged upon the activation of one of the plurality of camera preset positions; and a freeze frame system so when one of the plurality of camera presets is activated the camera image is frozen while the motorized camera adjustment system is engaged.

5. A telepresence system for connecting a plurality of local conferees with a distant conferee, the system comprising:

a local telepresence terminal, having a first codec for encoding video and audio of the plurality local conferees and decoding video and audio of the distant conferee, a first image display for producing an image of the distant conferee, a first speaker to produce the voice of the distant conferee, a first video camera and a second video camera capturing an image of the local conferees;

a plurality of personal control interfaces one for each of the plurality local conferees, each interface containing a microphone to capture the voice of the local conferee associated with that interface, the interfaces each associated with manually activating a selection of a single local conferee image, captured by the first camera, among the plurality of local conferees, thereby switching image capturing between the selection of each of the plurality of local conferees, the plurality of personal control interfaces mounted to the table and extending beyond an edge thereof with each of said plurality of personal control interfaces mounted to at least one of a bottom surface of the table or the edge of the table;

a table around which the plurality of local conferees are sitting so that each of the plurality of local conferees can easily access their interface;

a plurality of camera preset positions activated by at least one of voice activation and manually;

a motorized camera adjustment system for at least one of panning, tilting and zooming the first and second cameras and engaged upon the activation of one of the plurality of camera preset positions; and an alternating switch system so that when a single camera preset is activated an outgoing video signal switches from the first camera to the second camera and alternating back and forth upon additional activations.

6. The telepresence system of claim 5 wherein local conferees look into the eyes of the distant conferee in the image and the camera captures an image from a perspective of those eyes in that image.

7. The telepresence system of claim 5 wherein the outgoing video signal dissolves when switched between the first and second video cameras.

* * * * *